United States Patent [19]

Motoyama et al.

[11] 4,340,951
[45] Jul. 20, 1982

[54] OPERATION MODE DISPLAY APPARATUS

[75] Inventors: Kazuyasu Motoyama; Toshihiro Nakao; Katsumi Kanayama; Kenzi Furuta, all of Hachioji, Japan

[73] Assignee: Olympus Optical Co., Ltd., Tokyo, Japan

[21] Appl. No.: 149,926

[22] Filed: May 14, 1980

[30] Foreign Application Priority Data

May 24, 1979 [JP] Japan .................. 54-64230

[51] Int. Cl.³ .......................................... G11B 27/36
[52] U.S. Cl. .................... 369/53; 360/137; 360/31; 360/62
[58] Field of Search ............. 369/53, 47; 360/31, 360/137, 61, 62, 93, 72.2; 340/636, 644, 712, 365 C, 365 VL; 116/202

[56] References Cited

U.S. PATENT DOCUMENTS 3,800,316  3/1974  Kuharchuk ............... 360/74.7
3,916,121 10/1975  Stuzzi ........................ 369/53
4,003,093  1/1977  Satoh ......................... 360/137
4,150,435  4/1979  Satoh ......................... 360/31
4,214,281  7/1980  Sato .......................... 360/137

FOREIGN PATENT DOCUMENTS 2842613  4/1979  Fed. Rep. of Germany ...... 360/137
51-6524  1/1976  Japan ........................ 360/137

Primary Examiner—Alan Faber
Attorney, Agent, or Firm—Frishauf, Holtz, Goodman and Woodward

[57] ABSTRACT

An operation mode display apparatus comprises first and second display means (LED1 and LED2) capable of being operated independently of each other and a display state specifying means for specifying the display states of said first and second display means corresponding to an operation mode of a tape recorder. At least three operation modes of said tape recorder can be displayed by corresponding combinations of the display states of the first and second display means (LED1 and LED2).

15 Claims, 7 Drawing Figures

OPERATION MODE DISPLAY APPARATUS

BACKGROUND OF THE INVENTION

This invention relates to a display apparatus for displaying the operation mode of a tape recorder.

In a miniaturized tape recorder such as a microcassette tape recorder which uses manually operable touch switch buttons, a means for displaying its operation mode is necessary. The touch switch button undergoes practically no mechanical displacement when it is depressed. Also, it is usually not held in any mechanically displaced state. Therefore, unless an operation mode display means is provided, the user cannot tell to what operation mode the tape recorder is brought when a touch switch button is depressed. In the case of a large-size tape recorder, it is possible to provide exclusive light-emission diodes or the like for the individual operation modes of the tape recorder and obtain the display of an operation mode with the lighting of a light-emission diode that is caused when the corresponding touch switch button is operated. However, the case of a miniaturized tape recorder, in which the available space is limited, it is difficult to provide exclusive light-emission diodes for the individual operation modes. Besides, the use of a number of light-emission diodes is undesirable from the standpoint of the cost of the product.

There are at least two operation modes which should be displayed, namely a recording mode and a pause mode. The display of the former is necessary for distinguishing this mode from a playback mode, and that of the latter is necessary for distinguishing this state from the completely stopped state. It is also desirable that the display can distinguish a pause state of the recording mode and that of the playback mode from each other.

SUMMARY OF THE INVENTION

The object of the invention is to provide an operation mode display apparatus, which can display a number of operation modes of a tape recorder with combinations of a fewer number of display means.

For achieving the above object, the display apparatus according to the invention makes use of combinations of the on-off states of at least two display means or color changes at the time when they are turned "on" or "off" or their blinking action.

DETAILED DESCRIPTION OF THE PREFERRED EMBODIMENT

Figure 1:
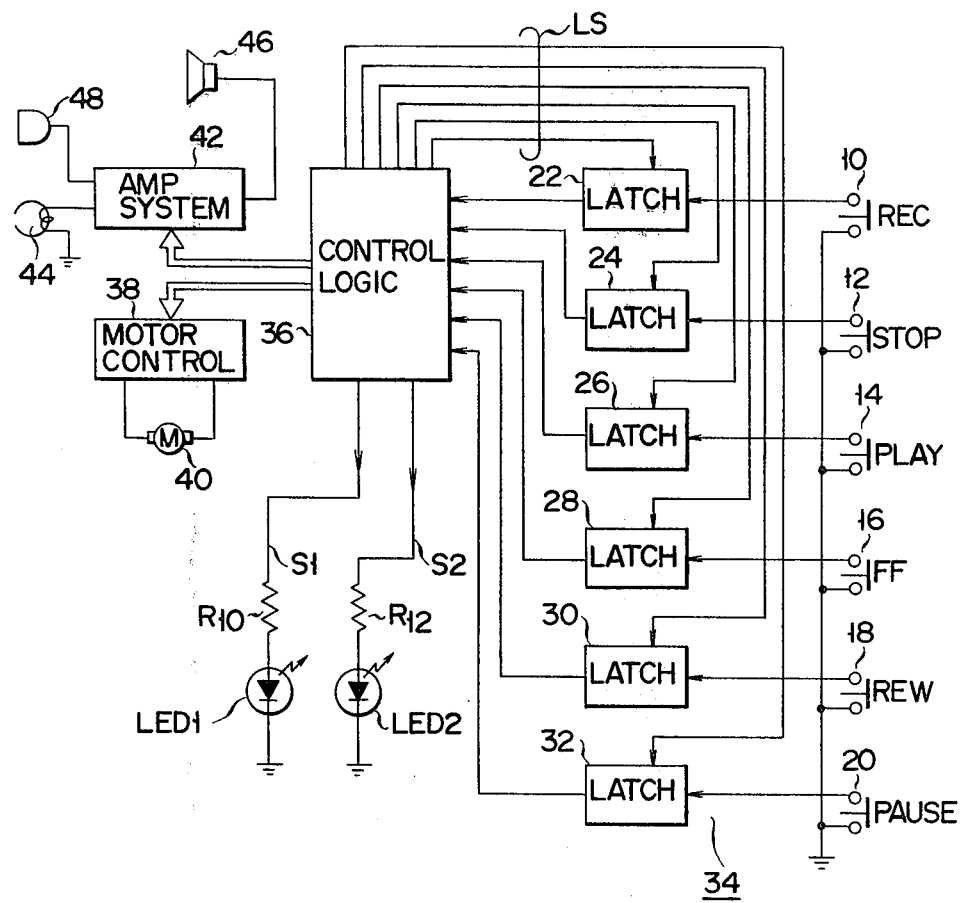
FIG. 1 is a block diagram showing an embodiment of the operation mode display apparatus according to the invention.

For brevity of the description, like parts in the drawings are designated by like reference numerals to avoid repetition of the description.

Referring now to FIG. 1, touch switches 10, 12, 14, 16, 18 and 20 are connected to respective latch circuits 22, 24, 26, 28, 30 and 32. These touch switches 10 to 20 are provided on an operation panel (not shown) of a tape recorder. They are respectively used for specifying corresponding operation modes, namely recording, stop, playback, fast feed, rewind and pause modes. The elements 10 to 32 constitute a display mode designation means 34 for designating a state corresponding to an operation mode of the tape recorder.

The output of each of the latch circuits 22 to 32 is supplied to a control logic 36. The control logic 36 has functions of determining an operation mode of the tape recorder according to the outputs of the latch circuits 22 to 32 and causing the display of the determined operation mode. For example, when the switch 14 is depressed, a playback instruction is coupled to the latch circuit 26. The playback instruction coupled to the latch circuit 26 is immediately supplied to the control logic 36. When the control logic 36 receives the playback instruction, it supplies a load signal LS to each of the latch circuits 22 to 32. As a result, the inputs of respective latch circuits at this time are memorized therein. At this time, only the switch 14 is "on", and the other switches 10, 12, 16 and 20 are all "off". Consequently, the playback instruction is stored only in the latch circuit 26, and the other latch circuits are cleared. Thus, when the loading of the latch circuits is ended, the playback instruction is continuously memorized in the latch circuit 26 even after the switch 14 is turned off.

When the control logic 36 receives the playback instruction from the latch circuit 26, it also gives a constant tape transport instruction to a motor control system 38. As a result, a motor 40 is rotated at a constant rpm to drive a tape in a tape deck (not shown) at a constant speed. The control logic 36 further renders an amplifier system 42 into the playback mode. Thus, a head 44 acts as reproducing head, and playback sound is produced from a loudspeaker 46. Where the playback mode is not included among the display items, the operation state of the tape recorder at this time is not displayed. Usually, at the time of the playback the playback sound is produced from the loudspeaker 46, and also the running of the tape can be seen. Thus, no inconvenience is felt in practice even if no particular display is provided for this mode.

For making the recording, the switches 10 and 14 are turned on. At this time, a recording instruction and a playback instruction are stored in the respective latch circuits 22 and 26 alone, in the manner as described above. In this case, the control logic 36 renders the amplifier system 42 into the recording mode while commanding the motor control system 38 to make the constant tape transport. Thus, the head 44 is used at this time as a recording head to effect recording of, for instance, a voice signal obtained from a microphone 48. At the time of the recording mode, a display of this mode is necessary so that it can be distinguished from the playback mode. For displaying the recording mode, the control logic 36 supplies a first indication signal S1 through a resistor R10 to a light-emission or light-emitting diode LED1. Another light-emission or light emitting diode LED2 is also connected through a resistor R12 to the control logic 36. The LED2 is turned "on" by a second indication signal, but it is "off" during recording. The light-emission diodes LED1 and LED2 constitute first and second display means, respectively.

For setting a pause mode at the time of the recording, the switch 20 is turned on. When the pause mode is set in, the recording mode is not released. In other words, when a pause instruction is stored in the latch circuit 32 with the switch 20 turned on, the load signal LS is not given to the latch circuit 22. When the pause mode is set at the time of the recording with the switch 20 turned on, the recording instruction and pause instruction are memorized in the respective latch circuits 22 and 32 alone. Thus, the control logic 36 gives a motor stop instruction to the motor control system 38 while holding the amplifier 42 in the recording mode. At this time, it also produces the second indication signal S2 to turn "on" or "off" the light-emission diode LED2. When the switch 14 is turned on in this state, the load signal LS is given to each of the latch circuit except the circuit 22. Thus, the recording and playback instructions are stored in the respective latch circuits 22 and 26 alone, and the recording mode is set in. Where a mechanism for preventing miss-recording is separately provided, the recording mode may be set when the switch 10 is solely turned on. When a pause is brought about from the playback mode, the amplifier system 42 is held in the playback mode while the motor control system 38 is given a motor stop instruction, so that only the LED2 is caused to flash or blink. As the control logic 36 may be used a conventional device, for instance Model SM-4 (one-chip microcomputer) made by Sharp Co., Japan or Model 8048 made by Intel Co., U.S.A. The details of the wiring between the control circuit 36 and the peripheral circuit thereof do not constitute a subject matter of the invention, so their description is not given here. However, one skilled in the art may readily realize a specific wiring with reference to detailed application notes provided by the manufacturers selling these microcomputers. Also, as the motor control system 38 may be used a conventional device, for instance Model TCA955 (integrated speed regulator) made by Siemens Co., West Germany.

With the construction described above, four different operation modes can be displayed by the two display means constituted by the respective light-emission diodes LED1 and LED2. Table 1 below shows an example of the relation between combinations of the "on" or "off" state of the light-emission diodes LED1 and LED2 and corresponding modes displayed.

TABLE 1

|  | OTHER THAN REC MODE | PAUSE MODE | |
| --- | --- | --- | --- |
| REC MODE | (EXCEPT PAUSE MODE) | REC | OTHER THAN REC |
| LED 1 ON | OFF | ON | OFF |
| LED 2 OFF | OFF | ON (GLINTING) | ON (GLINTING) |

Figure 1A:
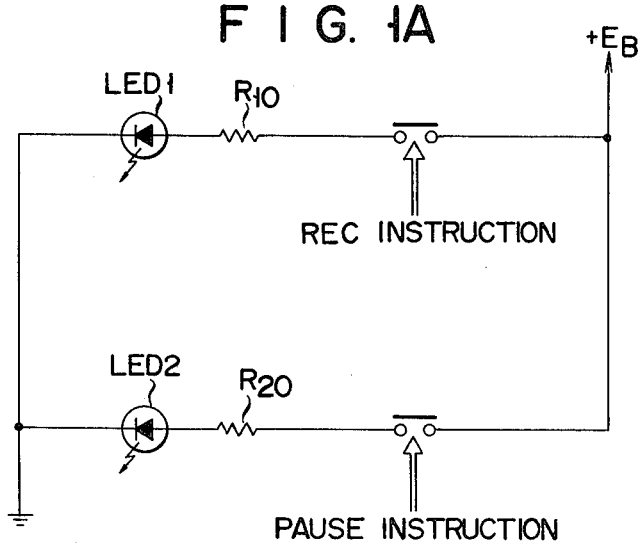
FIG. 1A is a circuit diagram showing a logic circuit which realizes a simple switch circuit providing the relation shown in Table 1 in the specification.

FIG. 1A shows a simple switch circuit which realizes the relation of Table 1. A logic circuit corresponding to this switch circuit is included in the control logic 36.

Figure 2:
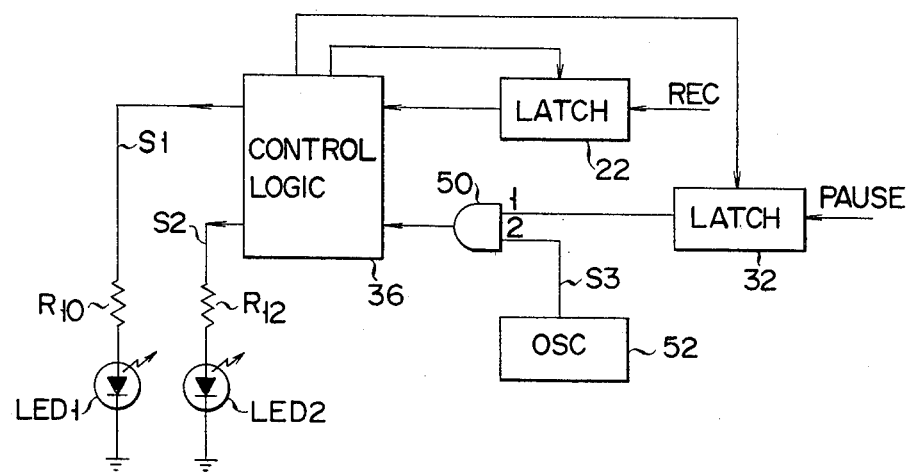
FIG. 2 is a schematic diagram showing a construction for causing the flashing or blinking of a second light-emission element LED2 in the apparatus shown in FIG. 1.

FIG. 2 shows a circuit construction which causes the light-emission diode LED2 to flash or blink when a pause is brought about. The pause instruction which is delivered from the latch circuit 32 is coupled to a first input terminal of an AND gate 50. An on-off signal S3 of a few Hz to 10 Hz is supplied from an oscillator 52 to a second input terminal of the AND gate 50. When the switch 20 (which is not shown in FIG. 2) is turned on so that the afore-mentioned pause instruction from the latch circuit 32 is inverted to a high level, the on-off signal S3 is coupled through the AND gate 50 to the control logic 36. Through the control logic 36 the on-off signal S3 is supplied as the second indication signal S2 to the LED2. As a result, the LED2 is on-off operated at the frequency of the on-off signal S3.

Figure 3:
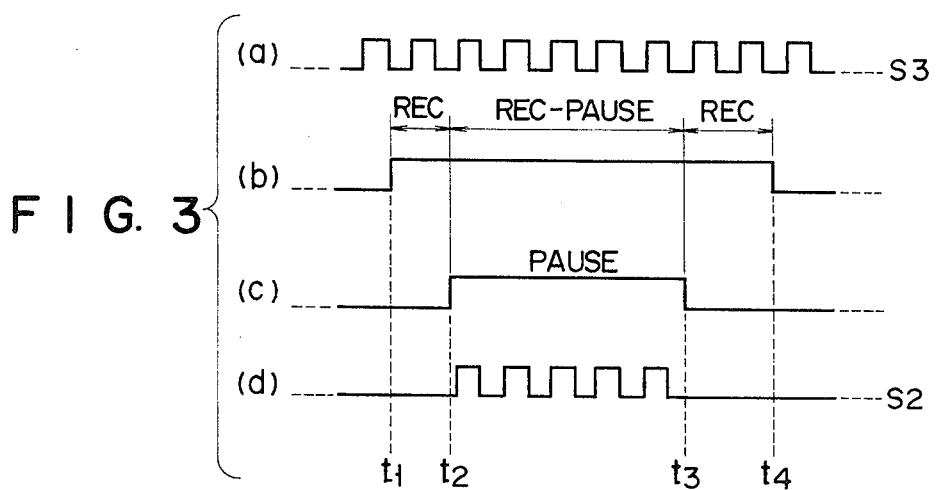
FIG. 3 is a timing chart illustrating the operation of the construction of FIG. 2.

FIG. 3 is a timing chart illustrating the sequence of events that take place when a pause is caused at the time of the recording mode. Shown at in FIG. 3(a) is the on-off signal S3. When the recording instruction of a high level is produced from the latch circuit 22 at the instant t1 as shown in FIG. 3(b), the light-emission diode LED1 is turned "on". Thus, it is displayed that the recording mode is set. When the pause instruction of the high level is produced from the latch circuit 32 at a subsequent instant t2, as shown in FIG. 3(c) the AND gate 50 is opened to couple the on-off signal S3 to the control logic 36, whereby the on-off operation of the light-emission diode LED2 is started in accordance with the second indication signal S3 as shown in FIG. 3(d). When the switch 14 shown in FIG. 1 is turned on at a later instant t3, the latch circuit 32 is cleared, that is, a state corresponding to what occurs by turning off the switch 20 is brought about. At this time, the AND gate 50 is closed. As a result, the LED 2 is turned "off". Also, the pause mode is released, and the recording mode is restored. In consequence, only the LED2 remains "on". When the switch 12 shown in FIG. 1, for instance, is turned on at an instant t4, the latch circuits 22 and 26 to 32 are all cleared so that the tape recorder is stopped. At this time, the LED1 is also turned "off".

Figure 4:
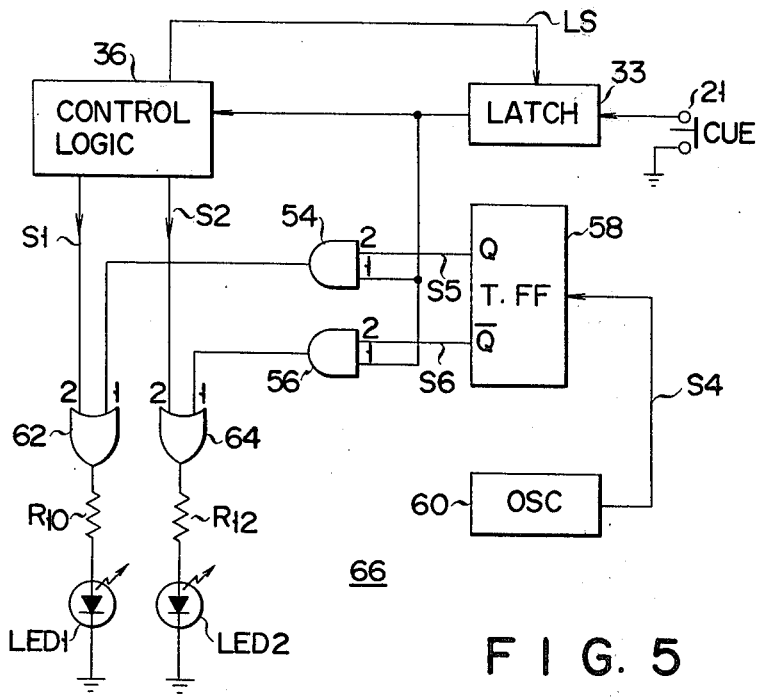
FIG. 4 is a schematic diagram showing a modification of the construction of FIG. 1, which is cooperating with the construction of FIG. 1.

FIG. 4 shows an arrangement, in which a function of displaying a cue signal recording mode is added to the construction of FIG. 1. The cue signal is recorded for searching the start point of the recorded contents, and the cue signal recording mode is distinguished from the ordinary recording mode. In this arrangement, an additional touch switch 21 for recording the cue signal is also provided on a tape deck (not shown). When the switch 21 is turned on, a cue signal recording instruction is given to the control logic 36, and also it is stored in a latch circuit 33 by the load signal LS. At this time, this cue signal recording instruction is further coupled to a first input terminal of each of AND gates 54 and 56. The AND gates 54 and 56 have their second input terminals connected to respective output terminals Q and $\bar{Q}$ of a T-type flip-flop 58. An on-off signal S4 at several Hz is coupled as clock signal from an oscillator 60 to the flip-flop 58.

The levels of signals S5 and S6 at the output terminals Q and $\bar{Q}$ of the flip-flop 58 are alternately inverted under the control of the on-off signal S4. When the cue signal recording instruction is at a high level, the signals S5 and S6 can pass through the AND gates 54 and 56. The signals S5 and S6 passing through the AND gates 54 and 56 are respectively coupled to first input terminals of OR gates 62 and 64. The outputs of the OR gates 62 and 64 are respectively coupled through the resistors R10 and R12 to the light-emission diodes LED1 and LED2. The afore-mentioned indication signals S1 and S2 from the control logic 36 are respectively coupled to second input terminals of the OR gates 62 and 64. When the cue signal recording instruction at the high level is produced from the latch circuit 33, the AND gates 54 and 56 are opened, while the first and second indication signals S1 and S2 are rendered to zero level. Thus, at this time the LED1 and LED2 are alternately on-off operated by the signals S5 and S6. When the latch circuit 33 is cleared, that is, when the cue signal recording mode is over, the AND gates 54 and 56 are closed. The display action of the LED1 and LED2 at this time has already been described in connection with FIG. 1. The elements 54, 58, 62 and 64 constitute an alternate on-off means 66 for alternately on-off operating the first and second light-emission diodes LED1 and LED2.

Figure 5:
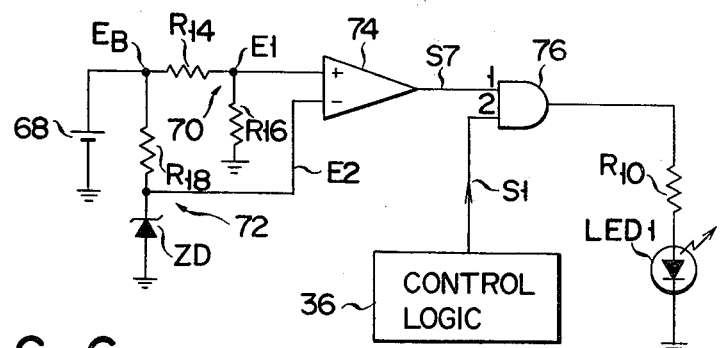
FIG. 5 is a schematic diagram showing a modification of the construction of FIG. 1, which is cooperating with the construction of FIG. 1 or 2.

FIG. 5 shows an arrangement, in which the deterioration of the battery is displayed by the light-emission diode LED1. A battery 68 which serves as power supply is connected in parallel with a voltage divider 70 consisting of resistors R14 and R16 and also with a constant-voltage circuit consisting of a resistor R18 and a zener diode ZD. The voltage division output of the voltage divider 70 is coupled as first voltage E1 to a non-inverted input terminal of an amplifier 74. Meanwhile, the stabilized output of the constant-voltage circuit 72 is coupled as second voltage E2 to an inverted input terminal of the amplifier 74. The amplifier 74 constitutes a comparator means. The first voltage E1 is changed in proportion to the electromotive force $E_B$ of the battery 68. On the other hand, the second voltage E2 is hardly changed with a change of the electromotive force $E_B$.

The output signal S7 of the amplifier 74 is coupled to a first input terminal of an AND gate 76. To a second input terminal of the AND gate 76 is coupled with the first indication signal S1 from the control logic 36. When the battery 68 is new, E1 is higher than E2. At this time, the output signal S7 of the amplifier 74 is at a high level, and the AND gate 76 is open. Thus, the signal S1 is passed through the AND gate 76 and supplied through the resistor R10 to the light-emission diode LED1. The display provided by the LED1 at this time is the same as described earlier in connection with FIG. 1; the LED1 is turned on when the recording mode is brought about. When the battery 68 is deteriorated so that E1 becomes lower than E2, the signal S7 is inverted to a low level. As a consequence, the AND gate 76 is closed. In this case, the LED1 is no longer turned on by the signal S1, that is, it will not be turned on even by depressing the recording switch 10, so that the user can know that the battery 68 is deteriorated.

The arrangements shown in FIGS. 2 and 5 may be combined for displaying the deterioration of the battery in terms of the on-off operation of the light-emission diode LED1. More particularly, an AND gate and an oscillator, similar to those 50 and 52 provided on the output side of the latch circuit 32 in FIG. 2, may be provided between the latch circuit 22 and the control logic 36, and this circuit may be applied to the circuit of FIG. 5. With this arrangement, the output of the latch circuit in FIG. 2 is coupled to the second input terminal of the AND gate 76 in FIG. 5, and the output of the AND gate 76 is coupled through the control logic 36 to the light-emission diode LED1.

Figure 6:
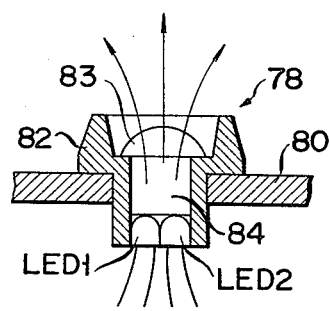
FIG. 6 is a sectional view showing a construction, in which a plurality of display means are collectively provided in one place.

The first and second display means LED1 and LED2 shown in FIGS. 1, 2 and 4 are disposed at positions spaced apart from each other, for instance, in the neighborhood of the respective switches 10 and 20 in FIG. 1. However, if these light-emission diodes LED1 and LED2 provide light of different colors, they may be collectively provided in one place. FIG. 6 shows a display unit 78, which effects the display of various operation modes of a tape recorder collectively in a single place or spot. It comprises a bracket 82 which is mounted in a front panel 80 of the tape recorder. The bracket 82 serves as a housing, and its portion on the outer side of the panel 80 has a central recess, in which a convex surface member 83 serving as a light diffuser is provided. The member 83 indicates the operation modes of the tape recorder. The member 83 is integrated with a coaxial cylindrical light collecting rod 84, which is pressure-fitted in a central hole formed in the bracket 82. The member 83 and rod 84 may be formed as an integral molding of, for instance, a white semitransparent resin. The light-emission diodes LED1 and LED2 are disposed adjacent to the end face of the rod 84 opposite the convex surface member 83. These light-emission diodes are held fixed in position within the bracket 82.

As the color of the light of the light-emission diodes LED1 and LED2, for instance, red and green may be used. When the display unit of FIG. 6 is employed in the construction of FIGS. 1 and 2, the following display is obtained. When the tape recorder is in a state other than the recording mode and/or pause state, the convex surface member 83 is dark. When the recording mode is brought about, the LED1 is turned "on", so that the member 83 becomes red. When a pause is brought about at the time of the playback mode, the LED2 is caused to flash or blink, so that the member 83 flashes or blinks with green light. When a pause is brought about at the time of the recording mode, the light-emission diode LED1 is turned "on", and the light-emission diode LED2 is caused to glint. Red light and green light are synthesized to produce orange light. Thus, in this case, the color of light produced from the member 83 periodically changed between red and orange. Further, for displaying the state of recording a cue signal with the construction of FIG. 4, the LED1 and LED2 are alternately on-off operated. Thus, at this time the color of the light produced from the member 83 is periodically changed between red and green.

As has been shown, with the dispay unit 78 shown in FIG. 6, four different displays can be obtained in a single place. If three or more light-emission diodes producing light of different colors are provided within the bracket 82, an increased number of different displays can be obtained in a single place.

Although specific constructions have been illustrated and described herein, it is not intended that the invention be limited to the elements and constructions disclosed. One skilled in the art will recognize that other particular elements or subconstructions may be used without departing from the scope and spirit of the invention. For example, it is possible to use incandescent lamps instead of the light-emission diodes LED1 and LED2 as the first and second display means. In this case, it is also possible to use suitable color filters in combination if it is desired to provide light having desired colors. Further, it is possible to employ graphic display using liquid crystal in lieu of the display by light emission from the light-emission diodes LED1 and LED2. In this case, it is of course possible to use three or more display means.

What we claim is:

1. An operation mode display apparatus for a multi-mode tape recorder, comprising:
   first and second light-emitting display elements capable of being operated to respective light producing and non-light producing states independently of each other;
   a display state specifying means in light communication with said first and second display elements for visually indicating the display states of said first and second display elements corresponding to respective operation modes of the tape recorder;
   a signal generating means for generating an on-off signal at a predetermined frequency;
   a first gate means coupled to said signal generating means for passing said on-off signal to energize at least one of said first and second display elements with said on-off signal when the tape recorder is in a pause mode; and
   display control means responsive to the tape recorder being in a recording mode for causing said first display element to be in the "on" or light emitting state and said second display element to be in the "off" or non-light emitting state;
   said display control means being further responsive to the tape recorder being in an operation mode other than the recording mode for causing said first and second display elements to both be in the "off" state; being responsive to the tape recorder being in the pause mode at the time of recording for causing said first display element to be in the "on" state and said second display element to be in a flashing state; and being responsive to the tape recorder being in the pause mode corresponding to another mode other than the recording mode for causing said first display element to be in the "off" state and said second display element to be in a flashing state, thereby displaying at least three operation modes of the tape recorder by different corresponding combinations of the display states of said first and second display elements.

2. The apparatus of claim 1, wherein said first and second light-emitting display elements are respective first and second light-emitting diodes.

3. The apparatus of claim 1, wherein said first and second light-emitting diodes are disposed at different positions, and said display state specifying means comprises at least two display state indicating surfaces which are in light communication with respective light-emitting diodes.

4. The apparatus of any one of claims 1, 2 or 3, wherein said first and second light-emitting display elements emit light of respective different colors.

5. The apparatus of claim 4, wherein said display state specifying means comprises a single display state indicating surface in light communication with both of said light-emitting display elements for indicating on said single indicating surface the display state of both of said first and second light-emitting display elements corresponding to an operation mode of the tape recorder.

6. The apparatus of any one of claims 1, 2 or 3, further comprising:
   a source of voltage for said tape recorder;
   a source of a predetermined voltage;
   a comparator means for comparing said predetermined voltage to said source of voltage for the tape recorder; and
   a second gate means coupled between said display state specifying means and said light-emitting display elements, and being further coupled to said comparator means, said second gate means being opened and closed according to the comparison result of said comparator means so as to cause said first light-emitting display element to be in its non-light producing state when said source voltage becomes lower than said predetermined voltage.

7. The apparatus of claim 6, wherein said first and second light-emitting display elements emit light of respective different colors.

8. The apparatus of claim 6, wherein the tape recorder has a cue signal recording mode, and further comprising:
   a further signal generating means for producing a further on-off signal at a predetermined frequency; and
   an alternate display means for causing said first and second light-emitting display elements to alternately be in a light-producing and a non-light producing state according to the frequency of said further on-off signal at the time of recording a cue signal for searching a starting point of recorded contents on a tape, said first and second display elements being alternately on-off operated when said cue signal is being recorded.

9. The apparatus of claim 8, wherein said first and second light-emitting display elements emit light of respective different colors.

10. The apparatus of any one of claims 1, 2 or 3, wherein the tape recorder has a cue signal recording mode, and further comprising:
    a further signal generating means for producing a further on-off signal at a predetermined frequency; and
    an alternate display means for causing said first and second light-emitting display elements to alternately be in a light-producing and a non-light producing state according to the frequency of said further on-off signal at the time of recording a cue signal for searching a starting point of recorded contents on a tape, said first and second display elements being alternately on-off operated when said cue signal is being recorded.

11. The apparatus of claim 10, wherein said first and second light-emitting display elements emit light of respective different colors.

12. An operation mode display apparatus for a multi-mode tape recorder, comprising:
    first and second light emitting diodes which respectively emit light of different colors, said light emitting diodes being capable of being operated to respective light producing and non-light producing display states independently of each other; and
    a single display state indicating surface in light communication with both of said light emitting diodes for indicating on said single indicating surface the display states of both of said first and second light emitting diodes corresponding to an operation mode of the tape recorder;
    wherein at least three operation modes of the tape recorder are displayable by respectively different combinations of the display states of said first and second light emitting diodes as displayed on said single indicating surface.

13. The apparatus of claim 12, further comprising:
    a first signal generating means for generating an on-off signal at a predetermined frequency;

a first gate means coupled to said first signal generating means for passing said on-off signal to energize at least one of said first and second light-emitting diodes with said on-off signal when the tape recorder is in a pause mode; and display control means responsive to the tape recorder being in a recording mode for causing said first light-emitting diode to be in the "on" or light-emitting state and said second light-emitting diode to be in the "off" or nonlight-emitting state;

said display control means being further responsive to the tape recorder being in an operation mode other than the recording mode for causing said first and second light-emitting diodes to both be in the "off" state, being responsive to the tape recorder being in the pause mode at the time of recording for causing said first light-emitting diode to be in the "on" state and said second light-emitting diode to be in a flashing state, and being responsive to the tape recorder being in the pause mode corresponding to another mode other than the recording mode for causing said first light-emitting diode to be in the "off" state and said second light-emitting diode to be in a flashing state, thereby displaying at least three operation modes of the tape recorder on said single indicating surface by different corresponding combinations of the display states of said first and second light-emitting diodes.

14. The apparatus of claim 12, further comprising:

a source of voltage for said tape recorder;

a source of a predetermined voltage;

a comparator means for comparing said predetermined voltage to said source of voltage for the tape recorder; and a second gate means coupled between said display state specifying means and said light-emitting diodes, and being further coupled to said comparator means, said second gate means being opened and closed according to the comparison result of said comparator means so as to cause said first light-emitting diode to be in its non-light producing state when said source voltage becomes lower than said predetermined voltage.

15. The apparatus of any one of claims 12, 13 or 14, wherein the tape recorder has a cue signal recording mode, and further comprising:

a further signal generating means for producing a further on-off signal at a predetermined frequency; and an alternate display means for causing said first and second light-emitting diodes to alternately be in a light producing and a non-light producing state according to the frequency of said further on-off signal at the time of recording a cue signal for searching a starting point of recorded contents on a tape, said first and second light-emitting diodes being alternately on-off operated when said cue signal is being recorded.

* * * * *